United States Patent
Oda et al.

(10) Patent No.: US 12,259,321 B2
(45) Date of Patent: Mar. 25, 2025

(54) METHOD FOR REMOVING BACKGROUND OF FLUORESCENCE LIFETIME MEASUREMENT AND METHOD FOR QUANTIFYING TARGET SUBSTANCE

(71) Applicant: HAMAMATSU PHOTONICS K.K., Hamamatsu (JP)

(72) Inventors: Akinori Oda, Hamamatsu (JP); Hiroshi Satozono, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 310 days.

(21) Appl. No.: 17/839,568

(22) Filed: Jun. 14, 2022

(65) Prior Publication Data

US 2022/0404280 A1    Dec. 22, 2022

(30) Foreign Application Priority Data

Jun. 22, 2021   (JP) ................ 2021-102976

(51) Int. Cl.
   *G01N 21/64*        (2006.01)

(52) U.S. Cl.
   CPC ..... *G01N 21/6408* (2013.01); *G01N 21/6428* (2013.01); *G01N 21/6486* (2013.01); *G01N 2021/6439* (2013.01)

(58) Field of Classification Search
   None
   See application file for complete search history.

(56) References Cited

U.S. PATENT DOCUMENTS

| | | | |
|---|---|---|---|
| 8,841,633 B2* | 9/2014 | Nicholls | G01N 21/6408 250/459.1 |
| 9,927,362 B2* | 3/2018 | Kumar | G01N 21/6408 |
| 11,402,328 B2* | 8/2022 | Oda | G01N 21/6408 |
| 2005/0221387 A1* | 10/2005 | Jibu | C07K 16/26 435/7.1 |
| 2015/0044763 A1* | 2/2015 | Nakada | G01N 33/542 702/19 |
| 2016/0146827 A1 | 5/2016 | Marriott et al. | |
| 2019/0056324 A1* | 2/2019 | Oda | G01N 21/6428 |
| 2019/0339201 A1* | 11/2019 | Seyfried | G01N 21/6458 |
| 2022/0404280 A1* | 12/2022 | Oda | G01N 21/6428 |

FOREIGN PATENT DOCUMENTS

| | | | |
|---|---|---|---|
| JP | 2013-534171 A | 9/2013 | |
| JP | 2014-122846 A | 7/2014 | |
| JP | 2016-538986 A | 12/2016 | |
| JP | 2019502125 A | 1/2019 | |
| WO | WO-2004090517 A1 * | 10/2004 | ...... G01N 21/6408 |
| WO | 2012024188 A1 | 2/2012 | |
| WO | 2015072964 A1 | 5/2015 | |
| WO | 2017121438 A1 | 7/2017 | |

* cited by examiner

Primary Examiner — David P Porta
Assistant Examiner — Djura Malevic
(74) *Attorney, Agent, or Firm* — Faegre Drinker Biddle & Reath LLP

(57) ABSTRACT

Provided is a method of quantifying a target substance present in a solvent comprises acquiring a first fluorescence decay curve and a second fluorescence decay curve to acquire some factors from the curves.

19 Claims, 9 Drawing Sheets

METHOD FOR REMOVING BACKGROUND OF FLUORESCENCE LIFETIME MEASUREMENT AND METHOD FOR QUANTIFYING TARGET SUBSTANCE

CROSS-REFERENCE TO RELATED APPLICATION

This application claims priority to Japanese Application No. 2021-102976 filed on Jun. 22, 2021, which is hereby incorporated by reference in its entirety.

TECHNICAL FIELD

The present invention relates to a method for removing a background of fluorescence lifetime measurement and a method for quantifying a target substance.

BACKGROUND

Quantification of a target substance present in a test sample is performed by a method of binding a fluorescent substance to the target substance and measuring a fluorescence intensity (for example, Patent Documents 1 and 2). A fluorescence lifetime is one of factors that affect measurement results of the fluorescence intensity, and accurate measurement of the fluorescence lifetime is important for accurate quantification of the target substance.

The fluorescence lifetime is obtained by measuring a fluorescence decay curve and curve-fitting the obtained fluorescence decay curve to a theoretical formula (generally, an exponential function with a plurality of components). In the measurement and analysis of the fluorescence decay curve, since presence of background light significantly affects the results and causes wrong analysis, accurate analysis of the background light is required.

PATENT DOCUMENT

[Patent Document 1] JP2014-122846
[Patent Document 2] WO2004/090517

SUMMARY

An objective of the present invention is to improve the accuracy of quantifying a target substance present in a solvent.

The present invention relates to the following [1] to [19].

[1] A method of quantifying a target substance present in a solvent using a fluorescent substance which binds to the target substance, the method comprising: a first step of acquiring a first fluorescence decay curve by irradiating a first sample comprising a first solvent and the target substance or the fluorescent substance and not comprising the target substance bound to the fluorescent substance with excitation light which excites the fluorescent substance to acquire a first weighting factor from the first fluorescence decay curve and a first fluorescence lifetime value; a second step of acquiring a second fluorescence decay curve by irradiating a second sample comprising a second solvent and the target substance bound to the fluorescent substance with excitation light which excites the fluorescent substance to acquire a second weighting factor from the second fluorescence decay curve, a second fluorescence lifetime value, the first fluorescence lifetime value, and the first weighting factor; and a third step of quantifying of the target substance from the second weighting factor.

[2] The method according to [1], wherein the first fluorescence lifetime value is acquired from the first fluorescence decay curve.

[3] The method according to [1], wherein the second fluorescence lifetime value is acquired from the second fluorescence decay curve.

[4] The method according to [1], wherein the second fluorescence lifetime value and the second weighting factor are acquired for a plurality of fluorescent components or a plurality of background components in the second step.

[5] The method according to [1], wherein the first fluorescence lifetime value and the first weighting factor are acquired for a plurality of fluorescent components or a plurality of background components in the first step.

[6] The method according to [1], wherein the first sample comprises only the target substance among the target substance and the fluorescent substance.

[7] The method according to [1], wherein the first sample comprises only the fluorescent substance among the target substance and the fluorescent substance.

[8] The method according to [1], wherein the target substance is a protein.

[9] The method according to [1], wherein a parameter having the second weighting factor is compared with a parameter having a second weighting factor obtained by performing the first step and the second step on a standard sample comprising the target substance at a known concentration in the third step.

[10] A method of quantifying a target substance present in a solvent using a fluorescent substance which binds to the target substance, the method comprising: a first step of acquiring a first fluorescence decay curve by irradiating a first sample comprising a first solvent and the target substance or the fluorescent substance and not comprising the target substance bound to the fluorescent substance with excitation light which excites the fluorescent substance to acquire a first weighting factor from the first fluorescence decay curve and a first fluorescence lifetime value; a second step of acquiring a second fluorescence decay curve by irradiating a second sample comprising a second solvent and the target substance bound to the fluorescent substance with excitation light which excites the fluorescent substance to acquire a second weighting factor from the second fluorescence decay curve, a second fluorescence lifetime value, the first fluorescence lifetime value, and the first weighting factor; and a third step of quantifying of the target substance from the second weighting factor, wherein the first fluorescence lifetime value is acquired from the first fluorescence decay curve, the second fluorescence lifetime value is acquired from the second fluorescence decay curve, and the first sample comprises only the target substance among the target substance and the fluorescent substance.

[11] The method according to [10], wherein the second fluorescence lifetime value and the second weighting factor are acquired for a plurality of fluorescent components or a plurality of background components in the second step.

[12] The method according to [10], wherein the first fluorescence lifetime value and the first weighting factor are acquired for a plurality of fluorescent components or a plurality of background components in the first step.

[13] The method according to [10], wherein the target substance is a protein.

[14] The method according to [10], wherein a parameter having the second weighting factor is compared with a parameter having a second weighting factor obtained by performing the first step and the second step on a standard sample comprising the target substance at a known concentration in the third step.

[15] A method of quantifying a target substance present in a solvent using a fluorescent substance which binds to the target substance, the method comprising: a first step of acquiring a first fluorescence decay curve by irradiating a first sample comprising a first solvent and the target substance or the fluorescent substance and not comprising the target substance bound to the fluorescent substance with excitation light which excites the fluorescent substance to acquire a first weighting factor from the first fluorescence decay curve and a first fluorescence lifetime value; a second step of acquiring a second fluorescence decay curve by irradiating a second sample comprising a second solvent and the target substance bound to the fluorescent substance with excitation light which excites the fluorescent substance to acquire a second weighting factor from the second fluorescence decay curve, a second fluorescence lifetime value, the first fluorescence lifetime value, and the first weighting factor; and a third step of quantifying of the target substance from the second weighting factor, wherein the first fluorescence lifetime value is acquired from the first fluorescence decay curve, the second fluorescence lifetime value is acquired from the second fluorescence decay curve, and the first sample comprises only the fluorescent substance among the target substance and the fluorescent substance.

[16] The method according to [15], wherein the second fluorescence lifetime value and the second weighting factor are acquired for a plurality of fluorescent components or a plurality of background components in the second step.

[17] The method according to [15], wherein the first fluorescence lifetime value and the first weighting factor are acquired for a plurality of fluorescent components or a plurality of background components in the first step.

[18] The method according to [15], wherein the target substance is a protein.

[19] The method according to [15], wherein a parameter having the second weighting factor is compared with a parameter having a second weighting factor obtained by performing the first step and the second step on a standard sample comprising the target substance at a known concentration in the third step.

According to the present invention, the accuracy of quantifying a target substance present in a solvent can be improved.

DETAILED DESCRIPTION

Figure 1:
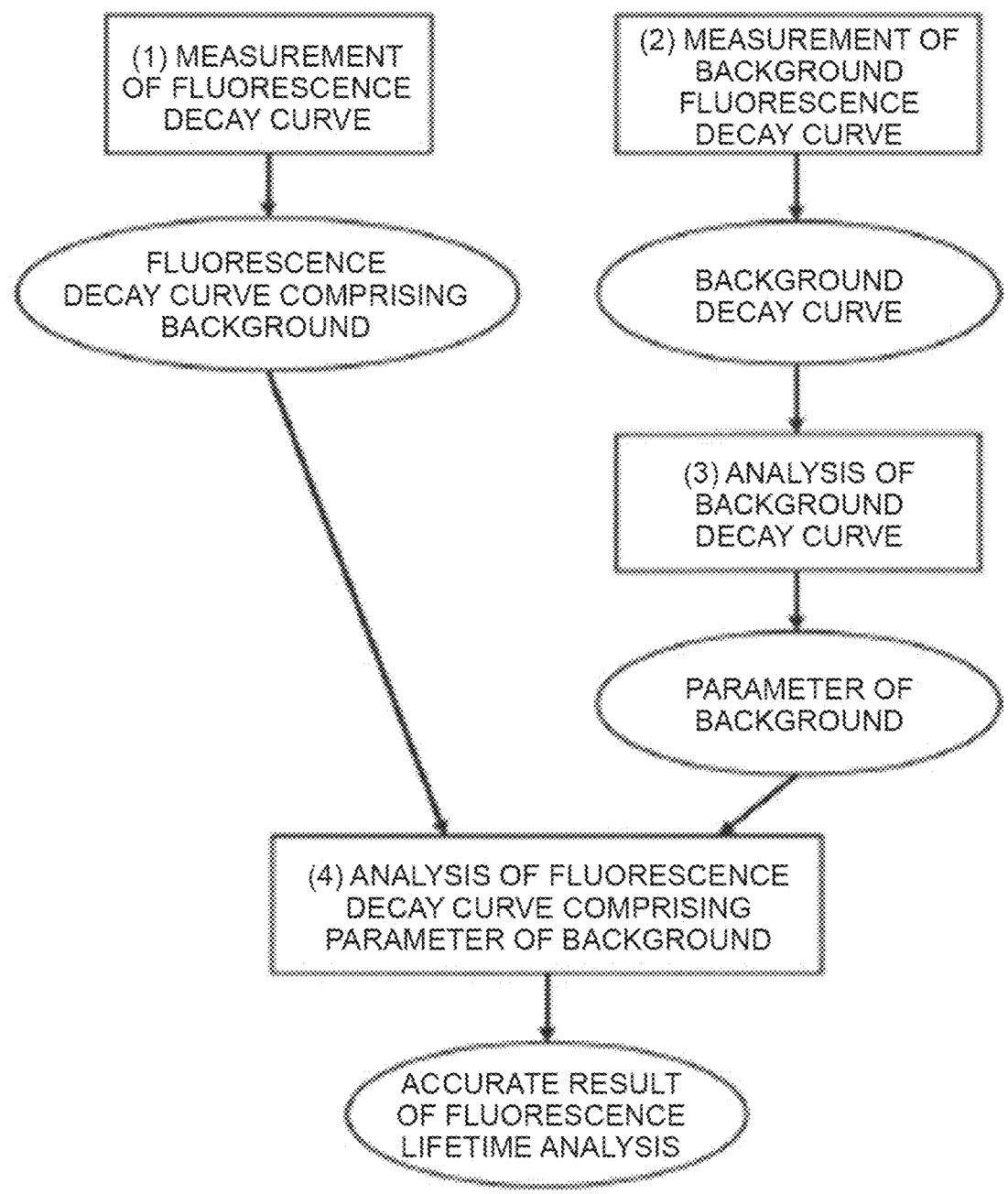
FIG. 1 shows a flowchart used for analyzing a fluorescence lifetime used for quantification of a target substance.

Hereinafter, an embodiment for implementing the present invention will be described in detail. However, the present invention is not limited to the following embodiment.

A method according to the present embodiment is a method of quantifying a target substance present in a solvent using a fluorescent substance which binds to the target substance, and comprises a first step of acquiring a first fluorescence decay curve by irradiating a first sample comprising a first solvent and the target substance or the fluorescent substance and not comprising the target substance bound to the fluorescent substance with excitation light which excites the fluorescent substance to acquire a first weighting factor from the first fluorescence decay curve and a first fluorescence lifetime value, a second step of acquiring a second fluorescence decay curve by irradiating a second sample comprising a second solvent and the target substance bound to the fluorescent substance with excitation light which excites the fluorescent substance to acquire a second weighting factor from the second fluorescence decay curve, a second fluorescence lifetime value, the first fluorescence lifetime value, and the first weighting factor, and a third step of quantifying of the target substance from the second weighting factor.

According to the method according to the present embodiment, the accuracy of measuring the fluorescence lifetime can be improved, and thereby the accuracy of quantifying the target substance can be improved.

As the target substance, proteins, nucleic acids, viruses, bacteria, contaminants, or the like can be exemplified. More specifically, for example, Aβ(1-42) aggregates or the like can be exemplified.

As the fluorescent substance, fluorochromes, fluorescent dyes, quantum dots, fluorescent beads, or the like can be exemplified. More specifically, for example, thioflavin S, 6-(2-fluoroethoxy)-2-(4-methylaminostyryl)benzoxazole (BF-168), 8-anilino-1-naphthalenesulfonic acid (ANS), thioflavin T, 2-(4'-aminophenyl)-6-methylbenzoxazole (MBPA), 2-(4'-methylaminophenyl)-6-methylbenzoxazole ((6-Me-) BTA-1), 2-(4'-dimethylaminophenyl)-6-iodobenzothiazole (TZDM), 2-(4'-methylaminophenyl)-6-hydroxybenzothiazole (PIB), 2-(4'-dimethylaminophenyl)-6-iodobenzoxazole (IBOX), ATTO 425, ATTO 390, or the like can be exemplified.

As the solvent, water, a buffer solution, a medium, or the like can be exemplified. More specifically, for example, purified water, ion-exchanged water, ultrapure water, phosphate buffered saline (PBS), tris buffered saline (TBS), glycine buffer solution (glycine-sodium hydroxide solution), DMSO-comprising medium, or the like can be exemplified. The solvent may comprise the first solvent and the second solvent, and the first solvent and the second solvent may be the same or different from each other.

(First Step)

In the first step, first, the first sample is irradiated with excitation light that excites the fluorescent substance, and the first fluorescence decay curve (background fluorescence decay curve B(t)) is acquired. This operation corresponds to "(2) Measurement of background fluorescence decay curve" in FIG. 1. In the first step, the background fluorescence decay curve B(t) can be analyzed by a multi-component exponential function. This operation corresponds to "(3) Analysis of background decay curve" in FIG. 1. $I_b(t)$ can be calculated by convolution-integrating the function $G_b(t)$ expressed by expression(3) according to expression(4), and a $\chi^2$ value can be calculated according to expression(5) from the $I_b(t)$ and the background fluorescence decay curve B(t). A best combination of $\tau_{b1}$ to $\tau_{bn}$ and $A_{b1}$ to $A_{bn}$ in expression (3) can be obtained by searching for a combination of variables that minimizes $\chi^2$ so that $I_b(t)$ and B(t) match best. $\tau_{b1}$ to $\tau_{bn}$ (first fluorescence lifetime values) and $A_{b1}$ to $A_{bn}$ (first weighting factors) obtained as a result of this analysis can be set as parameters of background components.

In expression(3), bn can be used as the number of components of the exponential function used for a background analysis. A value of the number of components bn may be arbitrary and is preferably a sufficient value to obtain a satisfactory fitting with $\chi^2 < 1.2$ as a guideline. In practice, about two to three components are generally used, but acquiring the first fluorescence lifetime value and the first weighting factor for a single component is not prevented. In expression(4), E(t) can be a device response function of a measuring device that has been measured in advance. In expression(5), $c_1$ can be a start time of the analysis and $c_2$ can be an end time of the analysis.

$$G_b(t) = \sum_{i=1}^{b_n} \left[ A_i \exp\left(-\frac{t}{\tau_i}\right) \right] \tag{3}$$

$$I_b(t) = \int E(t') G_b(t-t') dt' \tag{4}$$

$$\chi^2 = \sum_{j=c_1}^{c_2} \frac{[I_b(t_j) - B(t_j)]^2}{I_b(t_j)} \Big/ (c_2 - c_1 + 1) \tag{5}$$

In the first step, the first fluorescence lifetime value and the first weighting factor can be acquired for a plurality of fluorescent components or a plurality of background components. Due to acquiring the first fluorescence lifetime value and the first weighting factor, the fluorescence lifetime value of the target substance bound to the fluorescent substance can be measured more accurately, and as a result, the accuracy of quantifying the target substance is improved.

The first fluorescence lifetime value may be a known value or a value acquired from the first fluorescence decay curve.

Of the target substance and the fluorescent substance, the first sample may comprise only the target substance or may comprises only the fluorescent substance.

(Second Step)

In the second step, first, the second sample is irradiated with excitation light that excites the fluorescent substance, and the second fluorescence decay curve (fluorescence decay curve F(t) comprising the background) is acquired. This operation corresponds to "(1) Measurement of fluorescence decay curve" in FIG. 1. In the second step, the fluorescence decay curve F(t) comprising the background can be analyzed by a multi-component exponential function using the parameters of the background component obtained in the first step. This operation corresponds to "(4) Analysis of fluorescence decay curve comprising parameter of background" in FIG. 1. A function G(t) can be calculated according to expression(6), I(t) can be calculated by a convolution integration according to expression(7), and the $\chi^2$ value can be calculated according to expression(8) using the I(t) and the fluorescence decay curve F(t). It is possible to search for a combination of variables $\tau_1$ to $\tau_n$ and $A_1$ to $A_n$ that minimizes $\chi^2$ so that I(t) and F(t) match best. The $\tau_1$ to $\tau_n$ and $A_1$ to $A_n$ acquired as the result can be set as analysis results of the second fluorescence lifetime and the second weighting factor to be obtained. In expression(8), $c_1$ may be a start time of the analysis and $c_2$ may be an end time of the analysis. A value of the number of components n in expression(6) may be arbitrary and is preferably a sufficient value to obtain a satisfactory fitting with $\chi^2 < 1.2$ as a guideline. In practice, about two to three components are generally used, but acquiring the second fluorescence lifetime value and the second weighting factor for a single component is not prevented. In expression(6), bn, $A_1$ to $A_{bn}$, and $\tau_1$ to $T_{bn}$ are the number of background components and the parameters determined in the first step. In expression(7), E(t) can be the device response function of the measuring device that has been measured in advance.

$$G(t) = \sum_{i=0}^{n} \left[ A_i \exp\left(-\frac{t}{\tau_i}\right) \right] + \sum_{k=1}^{b_n} \left[ A_k \exp\left(-\frac{t}{\tau_k}\right) \right] \tag{6}$$

$$I(t) = \int E(t') G(t-t') dt' + C \tag{7}$$

$$\chi^2 = \sum_{j=c_1}^{c_2} \frac{[I(t_j) - F(t_j)]^2}{I(t_j)} \Big/ (c_2 - c_1 + 1) \tag{8}$$

The second fluorescence lifetime value may be a known value or a value acquired from the second fluorescence decay curve.

(Third Step)

A product of the second fluorescence lifetime value and the second weighting factor can be used as an amount of fluorescence of the fluorescent substance bound to the target substance of an unknown concentration. The first step and the second step can be each performed for a plurality of standard samples in which concentrations (or weights) of target substances are diverse, products (that is, amounts of fluorescence) of the second fluorescence lifetime values and the second weighting factors can be respectively obtained, and thereby the amounts of fluorescence and concentrations (or weights) can be plotted to create a calibration curve. A concentration (or weight) of the target substance can be quantified from this calibration curve and the amount of fluorescence obtained for the target substance of an unknown concentration (or weight). When it is not necessary to accurately obtain the concentration of the target substance, the calibration curve need not necessarily be created, and the amounts of fluorescence of the target substance may only be compared with those of some standard samples. Also, when the second fluorescence lifetime values of the target substances are guaranteed to be the same with those of the standard samples, it is not necessary to obtain the amounts of fluorescence from the products of the second fluorescence lifetime values and the second weighting factors, and only comparison of the second weighting factors may be performed.

EXAMPLES

Hereinafter, the present invention will be described in more detail with reference to examples. However, the present invention is not limited to the examples.

Example 1

An analysis example of the fluorescence decay curve according to the present invention will be described below according to the flowchart of FIG. 1. Further, in the present embodiment, in order to show that a more accurate answer can be obtained compared to that in a conventional method, a decay curve for verification, which is theoretically obtained from known parameters, will be used for explanation instead of a decay curve obtained in the experiment.

(1-1) Calculation of Decay Curve for Verification (1-1-1) Background Fluorescence Decay Curve A method of creating a background fluorescence decay curve will be described below. In an actual experiment, this operation corresponds to "(2) Measurement of background fluorescence decay curve" in FIG. 1.

Figure 2:
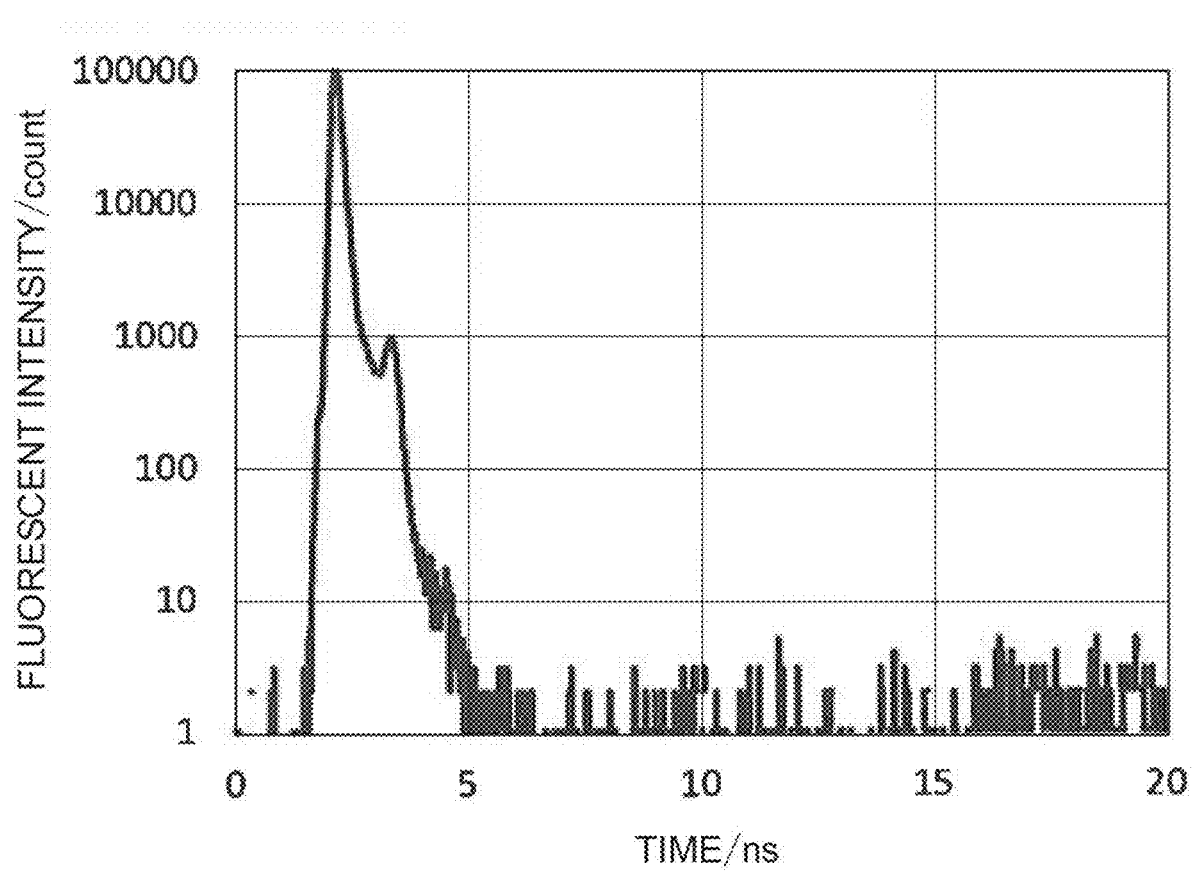
FIG. 2 shows a graph of a device response function E(t) of a measuring device.
Figure 3:
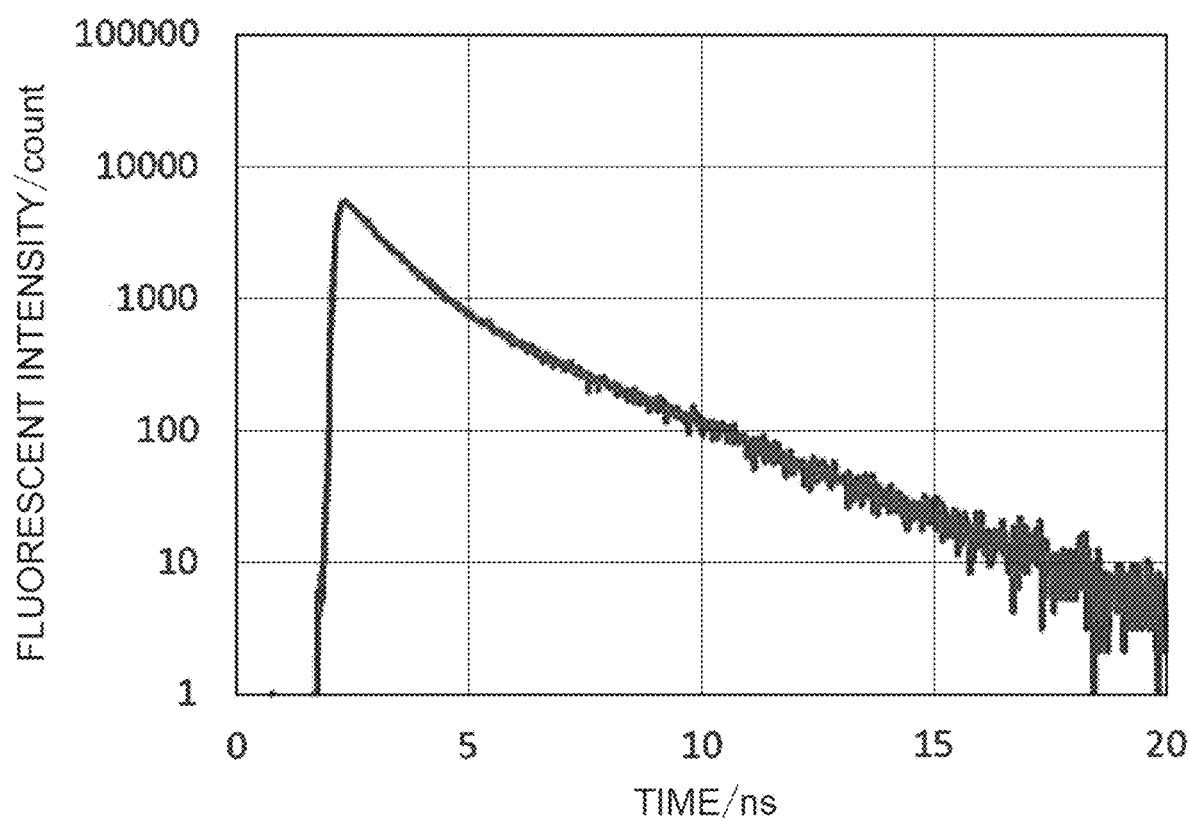
FIG. 3 shows a fluorescence decay curve (for verification) of a background component.

A fluorescence decay curve G(t) was obtained by substituting the background lifetime parameters shown in Table 1 into expression(1). Further, the subscript i in expression(1) denotes an order of background components. From G(t) and the device response function E(t) of the measuring device actually measured in advance that was shown in FIG. 2, a convolution integration was performed using expression(2) to obtain the decay curve I(t), and finally the background fluorescence decay curve B(t) was calculated by adding Poisson noise corresponding to the intensity. The calculated background fluorescence decay curve B(t) is shown in FIG. 3.

$$G(t) = \sum_{i=1}^{n}\left[A_i \exp\left(-\frac{t}{\tau_i}\right)\right] \quad (1)$$

TABLE 1

|  | i = 1 | i = 2 |
| --- | --- | --- |
| Lifetime value (τ) | 0.8 ns | 3.0 ns |
| Weighting factor (A) | 450 | 120 |

$$I(t) = \int E(t')G(t-t')dt' \quad (2)$$

(1-1-2) Fluorescence Decay Curve Comprising Background

Figure 4:
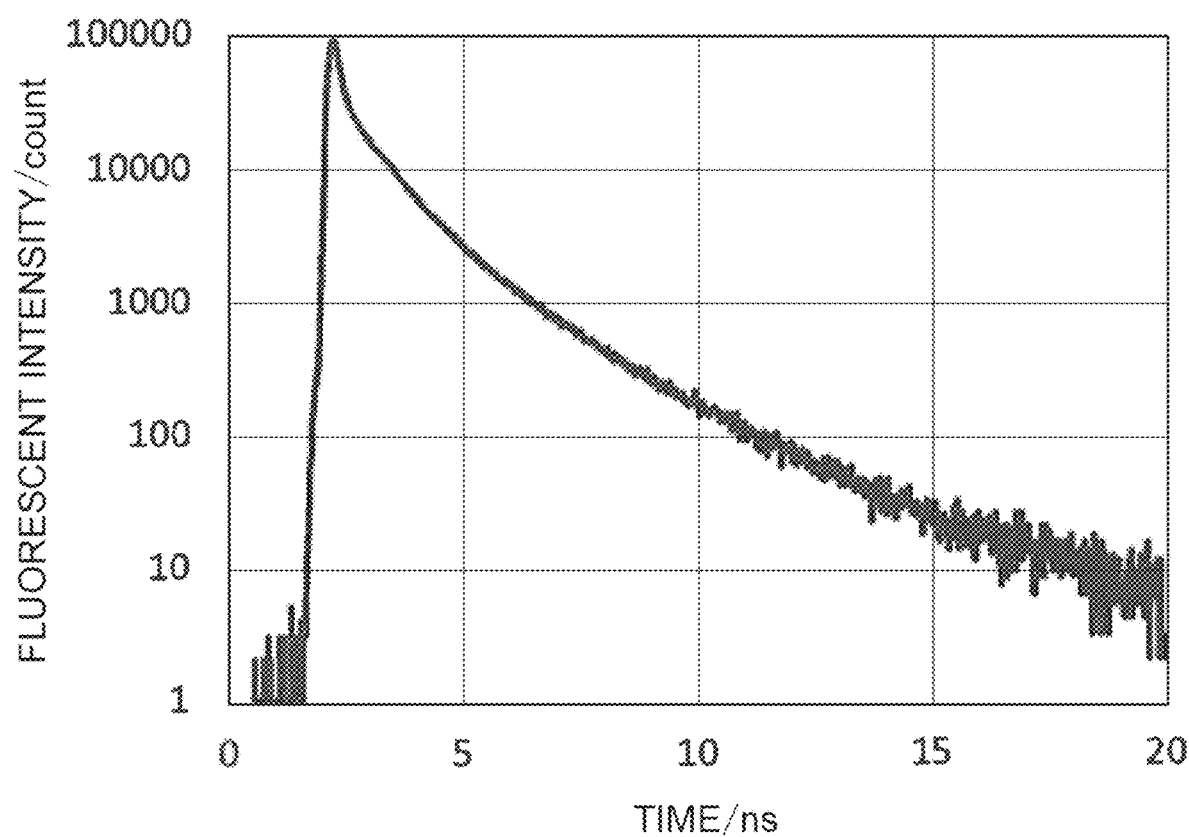
FIG. 4 shows a fluorescence decay curve (for verification) comprising a background component and a fluorescent component of a sample.

A method of creating the fluorescence decay curve comprising the background will be described below. In an actual experiment, this operation corresponds to "(1) Measurement of fluorescence decay curve" in FIG. 1. The fluorescence decay curve G(t) was obtained by substituting the fluorescence lifetime parameters and the background lifetime parameters shown in Table 2 into expression(1). Further, the subscript i in expression(1) denotes an order of background components. From G(t) and the device response function E(t) of the measuring device actually measured in advance that was shown in FIG. 2, a convolution integration was performed using expression(2) to obtain the decay curve I(t), and finally the fluorescence decay curve F(t) comprising the background was calculated by adding Poisson noise corresponding to the intensity. In the present parameters, a ratio of intensities between the fluorescent component and the background component, that is, an SN ratio, was 5. The calculated fluorescence decay curve F(t) comprising the background is shown in FIG. 4.

TABLE 2

|  | Fluorescence | | | Background | |
| --- | --- | --- | --- | --- | --- |
| Component i | i = 1 | i = 2 | i = 3 | i = 4 | i = 5 |
| Lifetime value (τ) | 0.05 ns | 0.6 ns | 1.5 ns | 0.8 ns | 3.0 ns |
| Weighting factor (A) | 24000 | 2000 | 800 | 450 | 120 |

(1-2) Analysis of Fluorescence Decay Curve Comprising Background According to the Present Invention On the basis of the present invention, a procedure and an example for analyzing the fluorescence decay curve comprising parameters of the background in the fluorescence decay curve F(t) comprising the background calculated in (1-1-2) will be described below.

(1-2-1) Analysis of Background Fluorescence Decay Curve

The background fluorescence decay curve B(t) calculated in (1-1-1) was analyzed by a multi-component exponential function. This operation corresponds to "(3) Analysis of background fluorescence decay curve" in FIG. 1. This analysis was performed by the following procedure. First, $I_b$(t) was calculated by convolution-integrating the function $G_b$(t) expressed by expression(3) according to expression (4), and the $\chi^2$ value was calculated according to expression (5) from the $I_b$(t) and the background fluorescence decay curve B(t) that was calculated in (1-1-1). A combination of variables that minimizes $\chi^2$ was searched for so that $I_b$ (t) and B(t) match best, and a best combination of $\tau_{b1}$ to $\tau_{bn}$ and $A_{b1}$ to $A_{bn}$ in expression(3) was obtained. $\tau_{b1}$ to $\tau_{bn}$ and $A_{b1}$ to $A_{bn}$ obtained as a result of this analysis were parameters of the background components.

In expression(3), bn is the number of components of the exponential function used for the background analysis. A value of the number of components bn is arbitrary, and is set to a sufficient value to obtain a satisfactory fitting with $\chi^2 < 1.2$ as a guideline. In practice, it is general to use about two to three components, and in the present example, two components (bn=2), which was the number of background components assumed when calculating the background fluorescence decay curve, were used. In expression(4), E(t) is a device response function of the measuring device that has been measured in advance. In expression(5), $c_1$ denotes a start time of the analysis, $c_2$ denotes an end time of the analysis, and in this analysis, a 101 channel at which a rise of the decay curve reaches 90% of a peak value was set as $c_1$, and a 1024 channel which was the measurement end time was set as $c_2$.

The results of the analysis are shown in Table 3. Errors between the parameters obtained in the analysis and the parameters used in (1-1-2) were each 2% or lower.

$$G_b(t) = \sum_{i=1}^{bn}\left[A_i \exp\left(-\frac{t}{\tau_i}\right)\right] \quad (3)$$

$$I_b(t) = \int E(t')G_b(t-t')dt' \quad (4)$$

$$\chi^2 = \sum_{j=c_1}^{c_2} \frac{[I_b(t_j) - B(t_j)]^2}{I_b(t_j)} / (c_2 - c_1 + 1) \quad (5)$$

TABLE 3

| Component i | i = 1 | i = 2 |
| --- | --- | --- |
| Lifetime value (τ) | 0.795 ns | 2.96 ns |
| Weighting factor (A) | 446 | 123 |

(1-2-2) Analysis of Fluorescence Decay Curve Comprising Background

Using the parameters of the background obtained in (1-2-1), the fluorescence decay curve F(t) comprising the background was analyzed by a multi-component exponential function. This operation corresponds to "(4) Analysis of fluorescence decay curve comprising parameter of background" in FIG. 1. The function G(t) was calculated according to expression(6), I(t) was calculated by a convolution integration according to expression(7), and the $\chi^2$ value was calculated according to expression(8) from the I(t) and the fluorescence decay curve F(t) that was calculated in (1-1-2). A combination of the variables $\tau_1$ to $\tau_n$ and $A_1$ to $A_n$ that minimizes $\chi^2$ was searched for so that I(t) and F(t) match best. The $\tau_1$ to $\tau_n$ and $A_1$ to $A_n$ obtained as the result can be set as analysis results of the second fluorescence lifetimes and the second weighting factors to be obtained. In expression(8), $c_1$ denotes a start time of the analysis, $c_2$ denotes an end time of the analysis, and in this analysis, a 114 channel at which a rise of the decay curve reaches 90% of a peak value was set as $c_1$, and a 1024 channel which was the measurement end time was set as $c_2$. The value of the number of components n in expression(6) is arbitrary, and needs to be a sufficient value to obtain a satisfactory fitting. In practice, $\chi^2<1.2$ is a guideline thereof. In the present example, the number of components n used when creating the fluorescence decay curve was set as n=3. Also, in expression(6), bn, $\tau_{b1}$ to $\tau_{bn}$ and $A_{b1}$ to $A_{bn}$ are the number of background components and the parameters determined in (1-2-1). In expression(7), E(t) is a device response function of the measuring device that has been measured in advance.

$$G(t) = \sum_{i=0}^{n}\left[A_i \exp\left(-\frac{t}{\tau_i}\right)\right] + \sum_{k=0}^{bn}\left[A_k \exp\left(-\frac{t}{\tau_k}\right)\right] \quad (6)$$

$$I(t) = \int E(t')G(t-t')dt' + C \quad (7)$$

$$\chi^2 = \sum_{j=c_1}^{c_2} \frac{[I(t_j) - F(t_j)]^2}{I(t_j)}/(c_2 - c_1 + 1) \quad (8)$$

With the analysis procedure describe above, fluorescence lifetime values $\tau_1$ to $\tau_3$ and weighting factors $A_1$ to $A_3$ of the corresponding lifetime values were obtained. The results of the analysis are shown in Table 4. Relative errors with respect to assumed parameters are shown in Table 5. The $\chi^2$, which was a guideline of the quality of the fitting, was 1.11 and thus the fitting was satisfactory. Unlike an analysis result by a conventional method described in comparative example 1 below, the lifetime value and the weighting factor used for creating the decay curve could be reproduced with an accuracy of 2% or lower for the fluorescent component. From this result, it was shown that the present invention could accurately separate the background and the fluorescent component and perform the analysis with high accuracy in the analysis of the fluorescence decay curve comprising the background.

TABLE 4

| Component (i, k) | Fluorescence | | | Background | |
|---|---|---|---|---|---|
| | i = 1 | i = 2 | i = 3 | k = 1 | k = 2 |
| Lifetime value (τ) | 0.050178 ns | 0.59678 ns | 1.4963 ns | 0.79529 ns | 2.9564 ns |
| Weighting factor (A) | 23957 | 1993.4 | 809.01 | 445.80 | 122.52 |

TABLE 5

| Component (i, k) | Fluorescence | | | Background | |
|---|---|---|---|---|---|
| | i = 1 | i = 2 | i = 3 | k = 1 | k = 2 |
| Lifetime value (τ) | 0.4% | −0.5% | −0.2% | −0.6% | −1.5% |
| Weighting factor (A) | −0.2% | −0.3% | 1.1% | −0.9% | 2.1% |

(Comparative Example 1) Analysis of Fluorescence Decay Curve Comprising Background by Conventional Method Results of a conventional method, that is, results in which the background component was treated as an additional component of the fluorescent component and analyzed at the same time as the target fluorescent component, are described below.

First, the function G(t) was calculated according to expression(9), I(t) was calculated by a convolution integration according to expression(10), and the $\chi^2$ value to be served as a guideline for fitting was calculated according to expression(11) from the I(t) and the fluorescence decay curve F(t) that was calculated in (1-1-2). A combination of variables $\tau_1$ to $\tau_n$ and $A_1$ to $A_n$ that minimizes $\chi^2$ was searched for so that I(t) and F(t) match best. The $\tau_1$ to $\tau_n$ and $A_1$ to $A_n$ obtained as the result were analysis results of the second fluorescence lifetimes and the second weighting factors to be obtained.

In expression(9), n is a number of the exponential function used in the analysis. Here, the number of background components 2 is added to 3 fluorescent components of the exponential function, and thus n=5. In expression(11), $c_1$ denotes a start time of the analysis, $c_2$ denotes an end time of the analysis, and in this analysis, a 114 channel at which a rise of the decay curve reaches 90% of a peak value was set as $c_1$, and a 1024 channel which was the measurement end time was set as $c_2$. The results of the analysis are shown in Table 6. Errors between the parameters obtained in the analysis and the parameters used in (1-1-2) are each shown in Table 7.

The $\chi^2$, which was a guideline of the quality of the fitting, was 1.09, and thus the fitting was satisfactory. However, the fluorescence lifetime values of the fluorescent component (i=2) and the background component (i=4) were the same, and the fluorescent component and the background component could not be separated. As a result, errors of the weighting factor in the fluorescent component (i=2), and errors of the fluorescence lifetime values and the weighting factors in the fluorescent component (i=3) and the background components (i=4 and i=5) were large. From this result, it was shown that, even if the exponential function component was simply increased to consider the background component, an analysis with highly accuracy could not be achieved.

$$G(t) = \sum_{i=1}^{n}\left[A_i \exp\left(-\frac{t}{\tau_i}\right)\right] \qquad (9)$$

$$I(t) = \int E(t')G(t-t')dt' + C \qquad (10)$$

$$\chi^2 = \sum_{j=c_1}^{c_2} \frac{[I(t_j) - F(t_j)]^2}{I(t_j)}/(c_2 - c_1 + 1) \qquad (11)$$

TABLE 6

| Component i | fluorescence | | | Background | |
| --- | --- | --- | --- | --- | --- |
| | i = 1 | i = 2 | i = 3 | i = 4 | i = 5 |
| Lifetime value (τ) | 0.050089 ns | 0.59906 ns | 1.3094 ns | 0.59906 ns | 2.6619 ns |
| Weighting factor (A) | 23968 | 1712.5 | 950.44 | 514.80 | 202.80 |

TABLE 7

| | Fluorescence Component i | | | Background | |
| --- | --- | --- | --- | --- | --- |
| | i = 1 | i = 2 | i = 3 | i = 4 | i = 5 |
| Lifetime value (τ) | 0.2% | −0.2% | −12.7% | −25.1% | −11.3% |
| Weighting factor (A) | −0.1% | −14.4% | 18.8% | 14.4% | 69.0% |

Example 2

An example in which the analysis method described in example 1 is applied to a fluorescence decay curve of a sample of Aβ(1-42) aggregates bound to thioflavin T will be described. In the present example, a fluorescent sample was an Aβ(1-42) aggregates bound to thioflavin T.

(2-1) Preparation of Aβ(1-42) Aggregates

Aβ(1-42) proteins (Peptide Institute, Inc.) derived from human was dissolved in dimethyl sulfoxide to 5 mmol/L and were further diluted to 100 µmol/L using 10 mmol/L hydrochloric acid. The obtained solution was left to stand in an incubator at 37° C. for 24 hours to prepare an Aβ(1-42) aggregate sample.

(2-2) Measurement of Background Fluorescence Decay Curve

Figure 5:
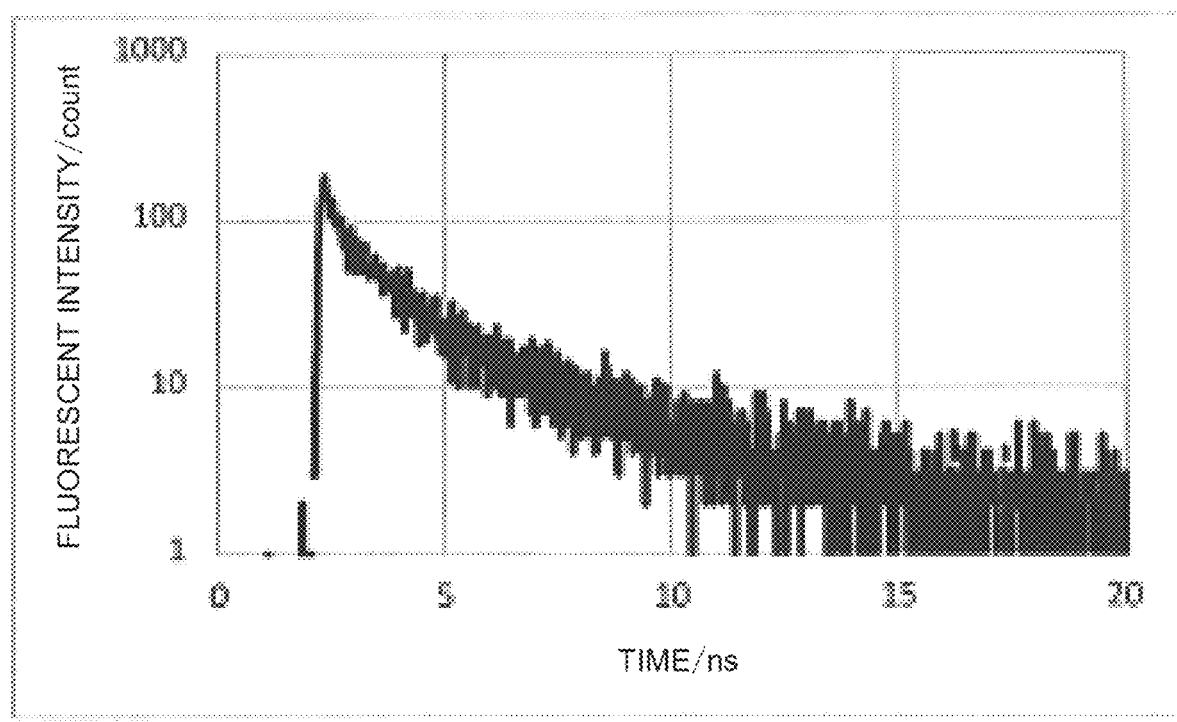
FIG. 5 shows a fluorescence decay curve of a background sample comprising Aβ(1-42) aggregates.

410 µL of glycine buffer solution (50 mmol/L glycine-sodium hydroxide solution pH 9.0) and 80 µL of distilled water were mixed with 10 µL of the Aβ(1-42) aggregate sample to prepare a background sample. For the background sample, measurement of the background fluorescence decay curve was performed at an excitation wavelength of 405 nm and an observation wavelength of 500 nm using a fluorescence lifetime measuring device (Quantaurus-Tau, Hamamatsu Photonics Co., Ltd.). The obtained background fluorescence decay curve $B_2(t)$ is shown in FIG. 5.

Figure 6:
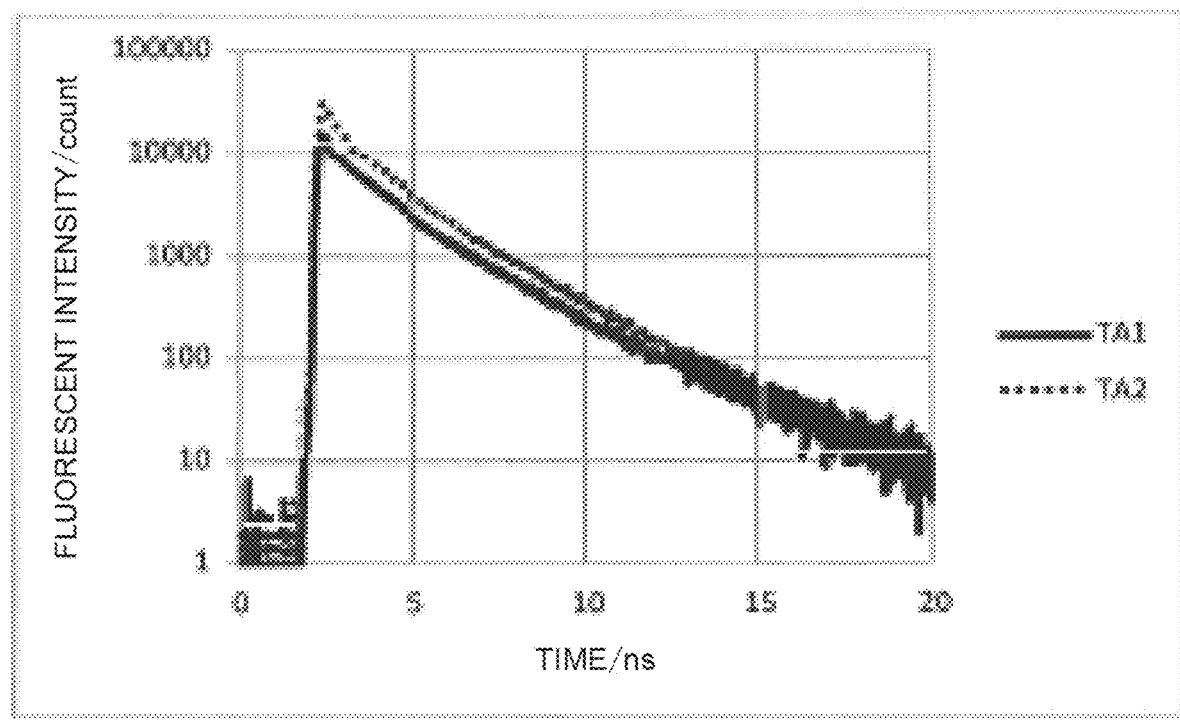
FIG. 6 shows a fluorescence decay curve of thioflavin T bound to Aβ(1-42) aggregates.

(2-3) Measurement of Fluorescence Decay Curve of Aβ(1-42) Aggregates Stained with Thioflavin T 410 µL of glycine buffer solution, and 10 µL of 100 µmol/L thioflavin T aqueous solution and 70 µL of distilled water or 20 µL of 100 µmol/L thioflavin T aqueous solution and 60 µL of distilled water were mixed with 10 µL of the Aβ(1-42) aggregate sample to prepare a sample (hereinafter, abbreviated as TA1) in which a ratio of the number of moles of thioflavin T to Aβ(1-42) was 1, and a sample (hereinafter, abbreviated as TA2) in which a ratio of the number of moles of thioflavin T to Aβ(1-42) was 2. For each sample, measurement of the fluorescence decay curve was performed at an excitation wavelength of 405 nm and an observation wavelength of 500 nm using the fluorescence lifetime measuring device (Quantaurus-Tau, Hamamatsu Photonics Co., Ltd.). Two obtained fluorescence decay curves $F_{TA1}(t)$ and $F_{TA2}(t)$ are shown in FIG. 6.

(2-4) Analysis of Background Fluorescence Decay Curve

"(3) Analysis of background fluorescence decay curve" in FIG. 1 will be described. From the background fluorescence decay curve obtained in (2-2), parameters of the background were determined according to the procedure of (1-2-1) of example 1. In calculation of the $\chi^2$ value, a combination of $\tau_{b1}$ to $\tau_{bn}$ and $A_{b1}$ to $A_{bn}$ that minimizes the $\chi^2$ value was searched for so that I(t) and $B_2(t)$ match best. In determination of the parameters, the decay curve was analyzed with three components. The obtained parameters of the background are shown in Table 8.

TABLE 8

| | First component | Second component | Third component |
| --- | --- | --- | --- |
| Lifetime value (τ) | 0.105 ns | 1.52 ns | 7.5 ns |
| Weighting factor (A) | 22 | 6.8 | 0.96 |

(2-5) Analysis of Fluorescence Decay Curve of Aβ(1-42) Aggregates Stained with Thioflavin T "(4) Analysis of fluorescence decay curve comprising parameter of background" in FIG. 1 will be described. From the fluorescence decay curve of Aβ(1-42) aggregates stained with thioflavin T obtained in (2-3) and the parameters of the background in Table 8, fluorescence decay curves were each analyzed according to the procedure of (1-2-1) of example 1. In calculation of the $\chi^2$ value, a combination of $\tau_1$ to $\tau_n$ and $A_1$ to $A_n$ that minimizes the $\chi^2$ value was searched for so that I(t) and $F_{TA1}(t)$ or $F_{TA2}(t)$ match best. The fluorescent moiety was analyzed with four components, that is, n=4. Analysis results of the fluorescence lifetime of the TA1 sample are shown in Table 9, and analysis results of the TA2 sample are shown in Table 10. Further, in Tables 9 and 10, parameters of the background components are omitted.

TABLE 9

| | First component | Second component | Third component | Fourth component |
| --- | --- | --- | --- | --- |
| Lifetime value (τ) | 0.02 ns | 0.33 ns | 1.2 ns | 2.5 ns |
| Weighting factor (A) | 3741 | 336 | 439 | 391 |

TABLE 10

| | First component | Second component | Third component | Fourth component |
| --- | --- | --- | --- | --- |
| Lifetime value (τ) | 0.01 ns | 0.29 ns | 1.2 ns | 2.5 ns |
| Weighting factor (A) | 12482 | 882 | 882 | 611 |

The $\chi^2$ values were both 1.2 or lower, and thus fittings were satisfactory. The fluorescence lifetime values of TA1 and TA2 matched each other except that the second components were slightly different.

Comparative Example 2

The fluorescence decay curves of TA1 and TA2 were directly analyzed with four exponential function components not according to the present invention (by the same method as that in comparative example 1). The results are each shown in Tables 11 and 12.

TABLE 11

|  | First component | Second component | Third component | Fourth component |
|---|---|---|---|---|
| Lifetime value ($\tau$) | 0.05 ns | 0.55 ns | 1.7 ns | 2.9 ns |
| Weighting factor (A) | 1919 | 393 | 518 | 186 |

TABLE 12

|  | First component | Second component | Third component | Fourth component |
|---|---|---|---|---|
| Lifetime value ($\tau$) | 0.01 ns | 0.30 ns | 1.3 ns | 2.5 ns |
| Weighting factor (A) | 12409 | 903 | 927 | 547 |

Even when the analysis was performed not according to the present invention (by the same method as that in comparative example 1), the $\chi^2$ values were both 1.2 or lower, and fittings were satisfactory. On the other hand, the fluorescence lifetime value showed different values according to a concentration. Considering that there is no change in fluorescence lifetime value due to a change in concentration except for a case in which a special dynamic interaction acts on fluorescent molecules, it is ascertained that the analysis result not based on the present invention is inaccurate, and the analysis result according to the present invention can be analyzed more accurately. From the results described above, it was shown that the fluorescence lifetime value can be more accurately analyzed by the present invention also in an actual sample, and it is suggested that the target substance can be quantified accurately.

Example 3

Another example in which the analysis method described in the reference example is applied to a fluorescence decay curve of an Aβ(1-42) aggregate sample bound to thioflavin T will be shown. In the present example, unlike example 2, fluorochrome thioflavin T is comprised in the sample for obtaining the background fluorescence decay curve, and it shows that the analysis can be performed accurately except for an influence of the background due to fluorescent impurities in thioflavin T. For the sake of simplification, portions overlapping those in example 2 will be omitted, and only portions that are different will be described.

(3-1) Preparation of Aβ(1-42) Aggregates

An Aβ(1-42) aggregate sample was prepared according to the procedure of (2-1) of example 2. A solvent used at the time of preparation (a liquid comprising dimethyl sulfoxide and hydrochloric acid which do not comprise either Aβ(1-42) proteins or Aβ(1-42) aggregates) is referred to as solvent A.

(3-2) Measurement of Background Fluorescence Decay Curve

Figure 7:
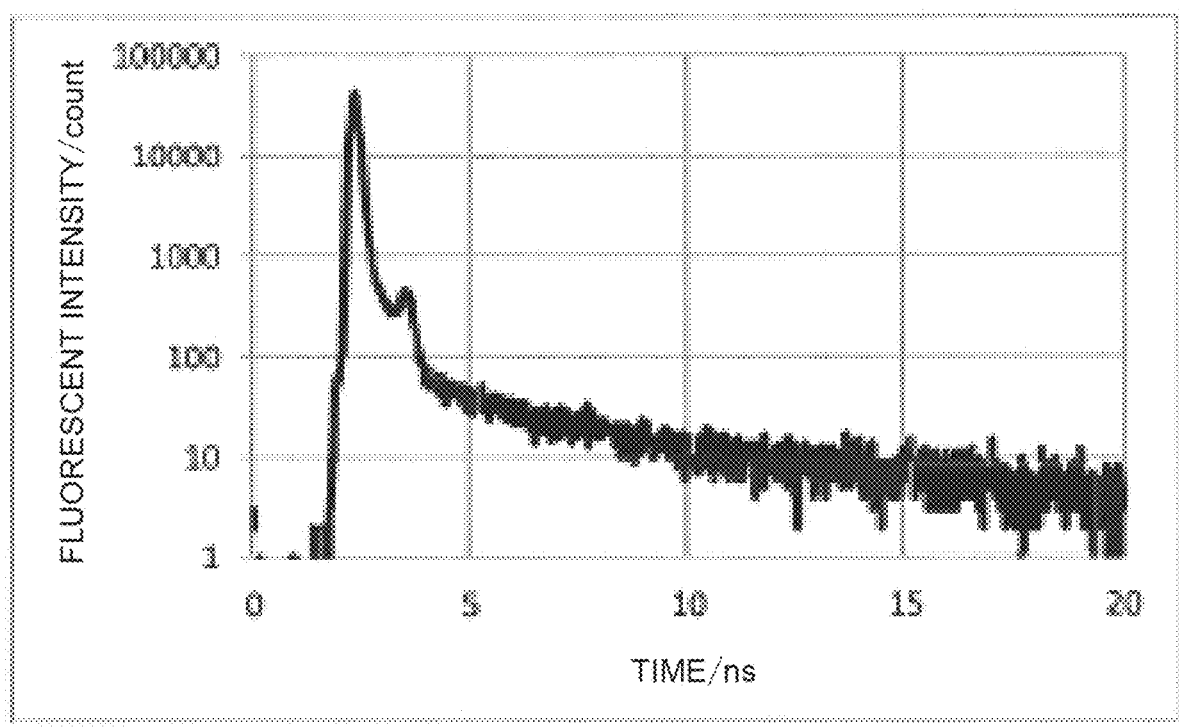
FIG. 7 shows a fluorescence decay curve of a background sample comprising thioflavin T.

800 μL of glycine buffer solution (50 mmol/L glycine-sodium hydroxide solution pH 9.0), 100 μL of 100 μmol/L thioflavin T aqueous solution, and 100 μL of the solvent A were mixed to prepare a background sample. For the sample, measurement of the background fluorescence decay curve was performed at an excitation wavelength of 405 nm and an observation wavelength of 500 nm using the fluorescence lifetime measuring device (Quantaurus-Tau, Hamamatsu Photonics Co., Ltd.). The obtained background fluorescence decay curve $B_3$ (t) is shown in FIG. 7.

Figure 8:
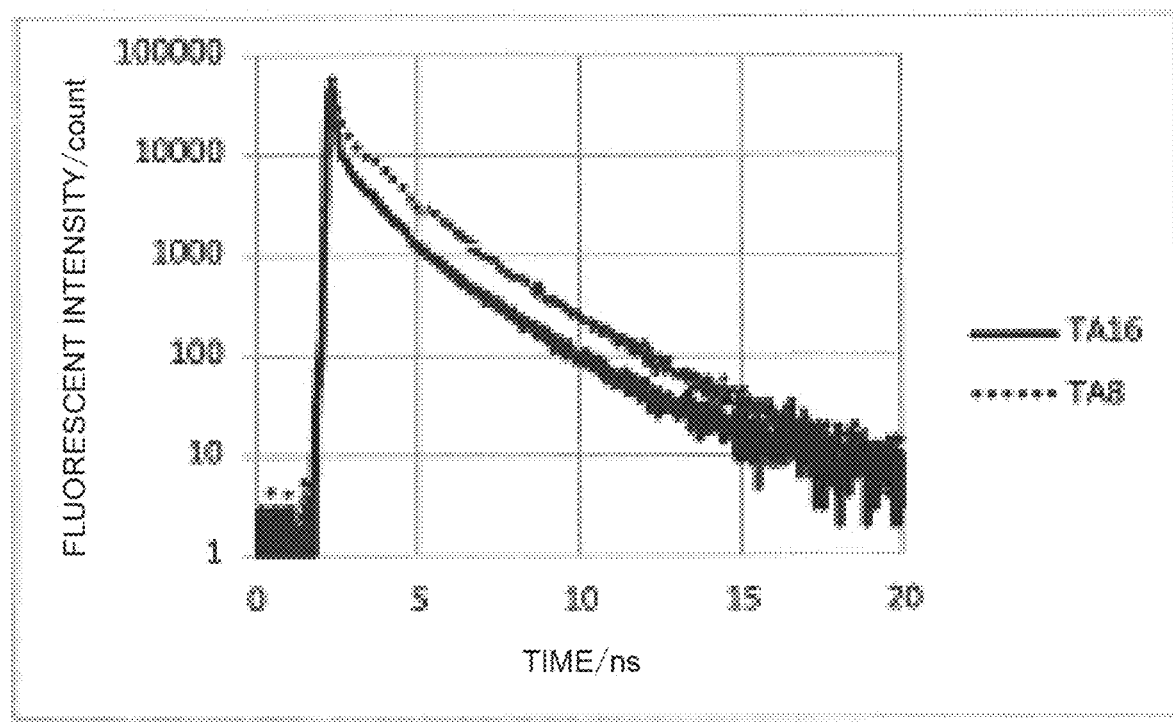
FIG. 8 shows a fluorescence decay curve of thioflavin T bound to Aβ(1-42) aggregates.

(3-3) Measurement of Fluorescence Decay Curve of Aβ(1-42) Aggregates Stained with Thioflavin T 100 μL of 100 μmol/L thioflavin T aqueous solution and 800 μL of glycine buffer solution were mixed with 12.5 μL of Aβ(1-42) aggregate sample with 7.5 μL of the solvent A8, and 6.25 μL of Aβ(1-42) aggregate sample with 93.75 μL of the solvent A to prepare a sample in which a ratio of the number of moles of thioflavin T to Aβ(1-42) was 8 (hereinafter abbreviated as TA8), and a sample in which a ratio of the number of moles of thioflavin T to Aβ(1-42) was 16 (hereinafter abbreviated as TA16), respectively. For each sample, measurement of the fluorescence decay curve was performed at an excitation wavelength of 405 nm and an observation wavelength of 500 nm using the fluorescence lifetime measuring device (Quantaurus-Tau, Hamamatsu Photonics Co., Ltd.). Two obtained fluorescence decay curves $F_{TA8}(t)$ and $F_{TA16}(t)$ are shown in FIG. 8.

(3-4) Analysis of Background Fluorescence Decay Curve

From the background fluorescence decay curve $B_3(t)$ obtained in (3-2), the parameters of the background were determined according to the procedure of (2-4) of example 2. In calculation of the $\chi^2$ value, a combination of $\tau_{b1}$ to $\tau_{bn}$ and $A_{b1}$ to $A_{bn}$ that minimizes the $\chi^2$ value was searched for so that I(t) and $B_3(t)$ match best. In determination of the parameters, the decay curve was analyzed with three components. Obtained parameters are shown in Table 13. Here, it is clear that first components $\tau_{b1}$ and $A_{b1}$ of the parameters are fluorescence derived from thioflavin T, and the other components are the background. Therefore, $\tau_{b2}$ to $\tau_{b3}$ and $A_{b2}$ to $A_{b3}$ were employed as the parameters of the background.

TABLE 13

|  | First component | Second component | Third component |
|---|---|---|---|
| Lifetime value ($\tau$) | 0.013 ns | 1.55 ns | 7.5 ns |
| Weighting factor (A) | 32630 | 6.9 | 2.6 |

(3-5) Analysis of Fluorescence Decay Curve of Aβ(1-42) Aggregates Stained with Thioflavin T From the two fluorescence decay curves of the Aβ(1-42) aggregates stained with thioflavin T obtained in (3-3) and the parameters of the background $\tau_{b2}$ to $\tau_{b3}$ and $A_{b2}$ to $A_{b3}$ in Table 13, the fluorescence decay curves $F_{TA8}(t)$ and $F_{TA16}(t)$ were each analyzed according to the procedure of (2-4) of example 2. In calculation of the $\chi^2$ value, a combination of $\tau_{b1}$ to $\tau_{bb}$ and $A_{b1}$ to $A_{bn}$ that minimizes the $\chi^2$ value was searched for so that I(t) and $F_{TA8}(t)$ or $F_{TA16}(t)$ match best. In this analysis, the fluorescent components were both analyzed with four components. The analysis results of the fluorescence lifetime in TA8 are shown in Table 14, and the analysis results of the fluorescence lifetime in TA16 are shown in Table 15.

TABLE 14

|  | First component | Second component | Third component | Fourth component |
|---|---|---|---|---|
| Lifetime value (τ) | 0.011 ns | 0.25 ns | 1.0 ns | 2.3 ns |
| Weighting factor (A) | 34821 | 1281 | 1125 | 528 |

TABLE 15

|  | First component | Second component | Third component | Fourth component |
|---|---|---|---|---|
| Lifetime value (τ) | 0.014 ns | 0.28 ns | 1.1 ns | 2.3 ns |
| Weighting factor (A) | 31336 | 470 | 445 | 188 |

The $\chi^2$ values were both 1.2 or lower, and fittings were satisfactory. It is ascertained that there is almost no change in the lifetime value due to a concentration, and the analysis has been accurately performed.

Comparative Example 3

The two fluorescence decay curves $F_{T48}(t)$ and $F_{T416}(t)$ were directly analyzed with four exponential function components not according to the present invention (by the same method as that in Comparative example 1). The results are each shown in Tables 16 and 17.

TABLE 16

|  | First component | Second component | Third component | Fourth component |
|---|---|---|---|---|
| Lifetime value (τ) | 0.012 ns | 0.29 ns | 1.2 ns | 2.6 ns |
| Weighting factor (A) | 34111 | 1310 | 1170 | 364 |

TABLE 17

|  | First component | Second component | Third component | Fourth component |
|---|---|---|---|---|
| Lifetime value (τ) | 0.015 ns | 0.40 ns | 1.5 ns | 3.4 ns |
| Weighting factor (A) | 30434 | 504 | 463 | 49 |

The $\chi^2$ values were both 1.2 or lower, and fittings were satisfactory. The lifetime values were different due to a change in concentration, and the analysis could not be accurately performed.

Example 4

An example in which the present invention is applied to quantification of a fluorescent labeling reagent ATTO 425 will be described. In the present example, a fluorescent sample was ATTO 425, and ATTO 390 was mixed as a background fluorescent material.

(4-1) Preparation of Sample

Biotin-modified ATTO 425 (AD425-71, ATTO-TECGmbH) serving as a target fluorescent substance and biotin-modified ATTO 390 (AD390-71, ATTO-TECGmbH) serving as a background fluorescent substance were dissolved in phosphate buffered saline having a pH of 7.4 and concentrations thereof were made to have 5 nM and 10 nM, respectively.

In the present sample, a fluorescence intensity of ATTO 425 is about 1.3 times that of the ATTO 390 of the background.

(4-2) Measurement of Background Fluorescence Decay Curve

Figure 9:
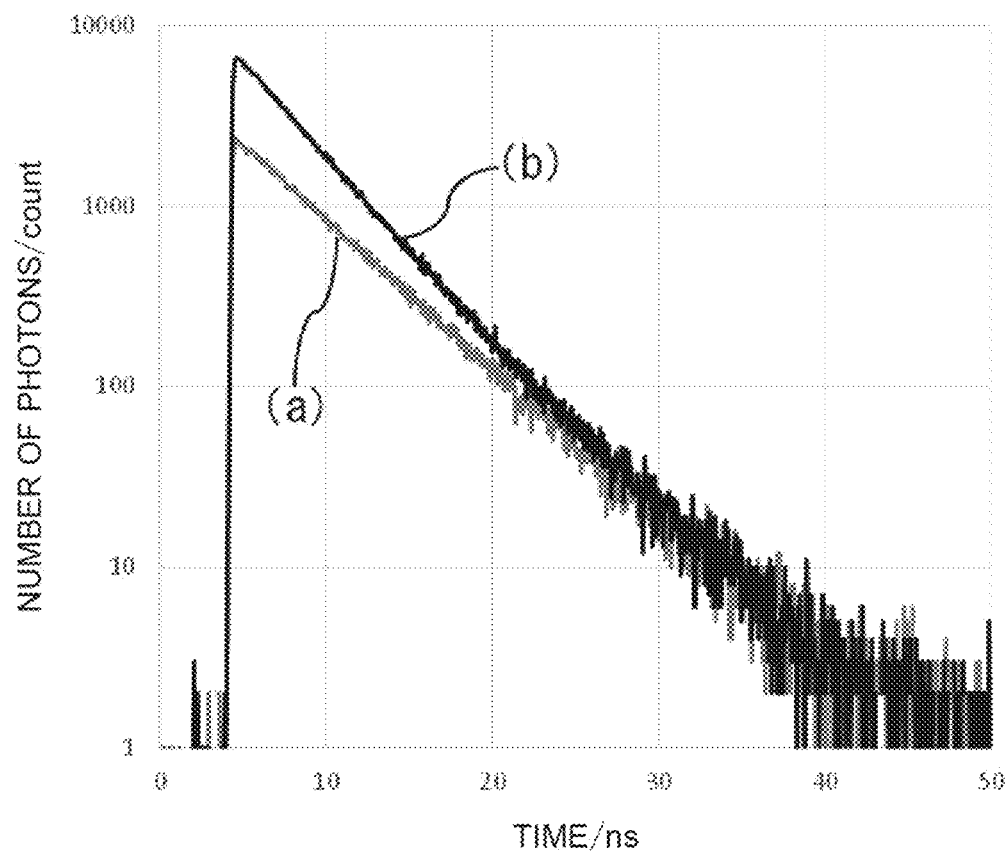
FIG. 9 shows a fluorescence decay curve of a background sample comprising biotin-modified ATTO 390 (a), and a fluorescence decay curve of a sample comprising biotin-modified ATTO 425 and biotin-modified ATTO 390 (b).

Biotin-modified ATTO 390 was dissolved in phosphate buffered saline having a pH of 7.4 to have a concentration of 10 nM. This sample was put in the fluorescence lifetime measuring device (Quantaurus-Tau, Hamamatsu Photonics Co., Ltd.), and a fluorescence decay curve was measured at an excitation wavelength of 405 nm and an observation wavelength of 500 nm. The obtained background fluorescence decay curve is shown as the curve (a) in FIG. 9.

(4-3) Measurement of Fluorescence Decay Curve of Sample

The sample prepared in (4-1) was put in the fluorescence lifetime measuring device (Quantaurus-Tau, Hamamatsu Photonics Co., Ltd.), and the fluorescence decay curve was measured at an excitation wavelength of 405 nm and an observation wavelength of 500 nm. The obtained fluorescence decay curve of the sample is shown as the curve (b) in FIG. 9.

(4-4) Analysis of Background Fluorescence Decay Curve

"(3) Analysis of background fluorescence decay curve" in FIG. 1 will be described.

From the background fluorescence decay curve obtained in (4-3), parameters of the background were determined according to the procedure of (1-2-1) of example 1. In determination of the parameters, the decay curve was analyzed with one component. The obtained parameters of the background are shown in Table 18.

TABLE 18

|  | First component |
|---|---|
| Lifetime value (τ) | 5.14 ns |
| Weighting factor (A) | 473 |

(4-5) Analysis of Fluorescence Decay Curve of Sample

The lifetime value and the weighting factor of the background fluorescence were obtained in advance on the basis of the present invention, and then both were used as constants when the decay curve of the sample was analyzed. The results are shown in Table 19.

TABLE 19

|  | First component | Background |
|---|---|---|
| Lifetime value (τ) | 3.51 ns | 5.14 ns (Constant) |
| Weighting factor (A) | 941 | 473 (Constant) |
| Fluorescence intensity | 3305 | 2432 |
| Fluorescence intensity ratio | 1.36 | 1.00 |

In Table 19, a fluorescence lifetime value of ATTO 425 was 3.51 ns and a fluorescence intensity ratio thereof was 1.36, and these were almost equivalent to accurate values of 3.6 ns and 1.3. Therefore, it was shown that the analysis method according to the present invention could accurately obtain the fluorescence lifetime value and the weighting factor even in a sample having background fluorescence (even in a sample in which a difference between the amount of fluorescence of the background component and that of the target fluorescent component was small).

Comparative Example 4

The background fluorescence was explicitly comprised in the analysis component to be analyzed, that is, two components of the fluorescent component and the background component of the sample were used for analyzing not according to the present invention. The results are shown in Table 20.

TABLE 20

|  | First component | Second component |
|---|---|---|
| Lifetime value ($\tau$) | 3.11 ns | 4.60 ns |
| Weighting factor (A) | 511 | 902 |
| Fluorescence intensity | 1588 | 4147 |
| Fluorescence intensity ratio | 0.38 | 1.00 |

In Table 20, the first component was thought to be the target fluorescence of ATTO 425, but wrong analysis results were obtained from the fact that the value was different from the accurate lifetime value of 3.6 ns of ATTO 425, and that the fluorescence intensity ought to be 1.3 times higher than that of the ATTO 390 of the background, but on the contrary, it was weaker. Therefore, in the present sample, it was not possible to analyze accurately by the method of explicitly comprising the background fluorescence in the analysis component.

Comparative Example 5

For example, JP6133053 discloses a method in which the background lifetime value is obtained first, and then analysis is performed with the background lifetime value as a constant and the weighting factor as a variable when the decay curve of the sample is analyzed. Results of analysis using the pre-measured lifetime value of ATTO 390 of 5.14 ns on the basis of this method are shown in Table 21.

TABLE 21

|  | First component | Background |
|---|---|---|
| Lifetime value ($\tau$) | 3.67 ns | 5.14 ns (Constant) |
| Weighting factor (A) | 1012 | 394 |
| Fluorescence intensity | 3713 | 2022 |
| Fluorescence intensity ratio | 1.83 | 1.00 |

In Table 21, the fluorescence lifetime value of ATTO 425 was 3.67 ns and was almost accurately obtained, but the fluorescence intensity ratio was 1.83 and was different from the accurate value of 1.3, and accurate analysis results could not be obtained. Therefore, in the method of JP6133053, the fluorescence intensity cannot be obtained accurately.

From the results described above, it was ascertained that the present invention can analyze the fluorescence lifetime value more accurately than the conventional method. Since accurate measurement of the fluorescence lifetime (and the weighting factor) leads to accurate quantification of the target substance, it can be thought that the target substance can be accurately quantified when the fluorescence lifetime values and the weighting factors obtained in examples 1 to 4 are used. The present examples show that, even when impurities are present in a fluorescence reagent, a more accurate fluorescence decay curve analysis is possible in consideration of those impurities.

What is claimed is:

1. A method of quantifying a target substance present in a solvent using a fluorescent substance which binds to the target substance, the method comprising:
    a first step of acquiring a first fluorescence decay curve by irradiating a first sample comprising a first solvent and the target substance or the fluorescent substance and not comprising the target substance bound to the fluorescent substance with excitation light which excites the fluorescent substance to acquire a first weighting factor from the first fluorescence decay curve and a first fluorescence lifetime value;
    a second step of acquiring a second fluorescence decay curve by irradiating a second sample comprising a second solvent and the target substance bound to the fluorescent substance with excitation light which excites the fluorescent substance to acquire a second weighting factor from the second fluorescence decay curve, a second fluorescence lifetime value, the first fluorescence lifetime value, and the first weighting factor; and
    a third step of quantifying of the target substance from the second weighting factor.

2. The method according to claim 1, wherein the first fluorescence lifetime value is acquired from the first fluorescence decay curve.

3. The method according to claim 1, wherein the second fluorescence lifetime value is acquired from the second fluorescence decay curve.

4. The method according to claim 1, wherein the second fluorescence lifetime value and the second weighting factor are acquired for a plurality of fluorescent components or a plurality of background components in the second step.

5. The method according to claim 1, wherein the first fluorescence lifetime value and the first weighting factor are acquired for a plurality of fluorescent components or a plurality of background components in the first step.

6. The method according to claim 1, wherein the first sample comprises only the target substance among the target substance and the fluorescent substance.

7. The method according to claim 1, wherein the first sample comprises only the fluorescent substance among the target substance and the fluorescent substance.

8. The method according to claim 1, wherein the target substance is a protein.

9. The method according to claim 1, wherein a parameter having the second weighting factor is compared with a parameter having a second weighting factor obtained by performing the first step and the second step on a standard sample comprising the target substance at a known concentration in the third step.

10. A method of quantifying a target substance present in a solvent using a fluorescent substance which binds to the target substance, the method comprising:
    a first step of acquiring a first fluorescence decay curve by irradiating a first sample comprising a first solvent and the target substance or the fluorescent substance and not comprising the target substance bound to the fluorescent substance with excitation light which excites the fluorescent substance to acquire a first weighting factor from the first fluorescence decay curve and a first fluorescence lifetime value;
    a second step of acquiring a second fluorescence decay curve by irradiating a second sample comprising a second solvent and the target substance bound to the fluorescent substance with excitation light which excites the fluorescent substance to acquire a second weighting factor from the second fluorescence decay curve, a second fluorescence lifetime value, the first fluorescence lifetime value, and the first weighting factor; and
    a third step of quantifying of the target substance from the second weighting factor,
    wherein the first fluorescence lifetime value is acquired from the first fluorescence decay curve, the second fluorescence lifetime value is acquired from the second fluorescence decay curve, and the first sample comprises only the target substance among the target substance and the fluorescent substance.

11. The method according to claim 10, wherein the second fluorescence lifetime value and the second weighting factor are acquired for a plurality of fluorescent components or a plurality of background components in the second step.

12. The method according to claim 10, wherein the first fluorescence lifetime value and the first weighting factor are acquired for a plurality of fluorescent components or a plurality of background components in the first step.

13. The method according to claim 10, wherein the target substance is a protein.

14. The method according to claim 10, wherein a parameter having the second weighting factor is compared with a parameter having a second weighting factor obtained by performing the first step and the second step on a standard sample comprising the target substance at a known concentration in the third step.

15. A method of quantifying a target substance present in a solvent using a fluorescent substance which binds to the target substance, the method comprising:
   a first step of acquiring a first fluorescence decay curve by irradiating a first sample comprising a first solvent and the target substance or the fluorescent substance and not comprising the target substance bound to the fluorescent substance with excitation light which excites the fluorescent substance to acquire a first weighting factor from the first fluorescence decay curve and a first fluorescence lifetime value;
   a second step of acquiring a second fluorescence decay curve by irradiating a second sample comprising a second solvent and the target substance bound to the fluorescent substance with excitation light which excites the fluorescent substance to acquire a second weighting factor from the second fluorescence decay curve, a second fluorescence lifetime value, the first fluorescence lifetime value, and the first weighting factor; and
   a third step of quantifying of the target substance from the second weighting factor,
   wherein the first fluorescence lifetime value is acquired from the first fluorescence decay curve, the second fluorescence lifetime value is acquired from the second fluorescence decay curve, and the first sample comprises only the fluorescent substance among the target substance and the fluorescent substance.

16. The method according to claim 15, wherein the second fluorescence lifetime value and the second weighting factor are acquired for a plurality of fluorescent components or a plurality of background components in the second step.

17. The method according to claim 15, wherein the first fluorescence lifetime value and the first weighting factor are acquired for a plurality of fluorescent components or a plurality of background components in the first step.

18. The method according to claim 15, wherein the target substance is a protein.

19. The method according to claim 15, wherein a parameter having the second weighting factor is compared with a parameter having a second weighting factor obtained by performing the first step and the second step on a standard sample comprising the target substance at a known concentration in the third step.

* * * * *